United States Patent
Steers

(10) Patent No.: US 9,430,046 B2
(45) Date of Patent: Aug. 30, 2016

(54) GESTURE BASED IMAGE CAPTURING SYSTEM FOR VEHICLE

(71) Applicants: DENSO International America, Inc., Southfield, MI (US); DENSO CORPORATION, Kariya-shi, Aichi-ken (JP)

(72) Inventor: Michael Steers, Novi, MI (US)

(73) Assignees: Denso International America, Inc., Southfield, MI (US); DENSO CORPORATION, Kariya, Aichi-pref. (JP)

(*) Notice: Subject to any disclaimer, the term of this patent is extended or adjusted under 35 U.S.C. 154(b) by 296 days.

(21) Appl. No.: 14/156,503

(22) Filed: Jan. 16, 2014

(65) Prior Publication Data

US 2015/0199019 A1    Jul. 16, 2015

(51) Int. Cl.
G06F 3/01 (2006.01)
B60K 37/06 (2006.01)

(52) U.S. Cl.
CPC .............. *G06F 3/017* (2013.01); *B60K 37/06* (2013.01); *G06F 3/013* (2013.01)

(58) Field of Classification Search
CPC ........ G06F 3/017; G06F 3/013; B60K 37/06
See application file for complete search history.

(56) References Cited

U.S. PATENT DOCUMENTS

| | | | | |
|---|---|---|---|---|
| 2002/0140849 A1* | 10/2002 | Slatter | ............... | H04N 7/185 348/375 |
| 2003/0201895 A1* | 10/2003 | Harter, Jr. | ............... | B60K 37/02 340/575 |
| 2005/0225638 A1* | 10/2005 | Tanaka | ............... | H04N 5/23203 348/159 |
| 2006/0173577 A1* | 8/2006 | Takeda | ............... | G06T 7/0042 700/245 |
| 2007/0279521 A1* | 12/2007 | Cohen | ............... | G06K 9/00664 348/376 |
| 2008/0012938 A1* | 1/2008 | Kubota | ............... | B60Q 9/008 348/118 |
| 2010/0278393 A1* | 11/2010 | Snook | ............... | G06F 3/011 382/107 |
| 2010/0281439 A1* | 11/2010 | Markovic | ............... | G06F 3/016 715/863 |
| 2011/0109581 A1 | 5/2011 | Ozawa et al. | | |
| 2011/0154266 A1* | 6/2011 | Friend | ............... | A63F 13/06 715/863 |
| 2011/0304650 A1 | 12/2011 | Campillo et al. | | |
| 2012/0105613 A1 | 5/2012 | Weng et al. | | |
| 2012/0142415 A1* | 6/2012 | Lindsay | ............... | H04N 5/2224 463/33 |
| 2012/0146903 A1* | 6/2012 | Arihara | ............... | G06F 3/011 345/158 |
| 2013/0050069 A1* | 2/2013 | Ota | ............... | G06F 3/011 345/156 |
| 2013/0055143 A1* | 2/2013 | Martin | ............... | G06F 3/0425 715/779 |
| 2013/0063340 A1 | 3/2013 | Mondragon et al. | | |
| 2013/0066526 A1 | 3/2013 | Mondragon et al. | | |
| 2013/0307765 A1 | 11/2013 | Li | | |
| 2014/0063055 A1* | 3/2014 | Osterhout | ............... | G06F 3/005 345/633 |
| 2014/0121883 A1* | 5/2014 | Shen | ............... | B62D 15/0285 701/28 |

(Continued)

*Primary Examiner* — Jay Patel
*Assistant Examiner* — Joseph Suh
(74) *Attorney, Agent, or Firm* — Harness, Dickey & Pierce, P.L.C.

(57) ABSTRACT

An image capturing system for a vehicle captures an image of a target area based on a predefined gesture performed by an occupant of the vehicle. A gesture capture device determines a gesture position of a gesture, which is the predefined gesture, with respect to a reference point. An eye tracking device determines an eye position of the occupant based on a viewpoint of the occupant. A target area determination module determines a target vector extending from the eye position toward the gesture position and aligns an on-board camera with the target vector, such that the target vector passes through an image field-of-view of the on-board camera. The on-board camera captures an image of the target area which is within the image field-of-view, and the image is stored in a computer-readable medium.

16 Claims, 13 Drawing Sheets

(56) References Cited

U.S. PATENT DOCUMENTS

| | | | | |
|---|---|---|---|---|
| 2014/0136054 A1* | 5/2014 | Hsia | ............ | B60R 1/00 701/42 |
| 2014/0267004 A1* | 9/2014 | Brickner | ............ | G06F 3/017 345/156 |
| 2014/0340465 A1* | 11/2014 | Shi | ............ | H04N 7/15 348/14.03 |
| 2015/0175172 A1* | 6/2015 | Truong | ............ | B60W 50/10 701/36 |
| 2015/0193001 A1* | 7/2015 | Kurokawa | ............ | G06T 7/20 345/156 |

* cited by examiner

GESTURE BASED IMAGE CAPTURING SYSTEM FOR VEHICLE

FIELD

The present disclosure relates to an image capturing system disposed in a vehicle for capturing an image based on a gesture performed by an occupant of the vehicle.

BACKGROUND

This section provides background information related to the present disclosure which is not necessarily prior art.

A gesture controlled device allows a user to control the device based on a movement of a user. More practically, gestures performed by the user are monitored and recognized by the device. The device may then perform an action based on the gestures recognized. In addition to gesture recognition, devices may also monitor or track the movement of a user's eye as a method for controlling the device. For example, a device may move a cursor on a screen based on a gaze direction of the user's eyes. Gesture and eye-based control of a device permits a user to control the device without the use of a dedicated input device, such as a mouse, touch screen, or a control pad.

Gesture and eye recognition techniques have also been implemented in vehicle systems. For example, eye tracking devices may be used to monitor a driver's awareness, and gesture recognition techniques permit an occupant to control vehicle systems displayed on a display by moving their hand across a pad which translates the movement onto the display. Use of gesture and eye based control for a vehicle system allows the occupant to control the device without having to use a dedicated interface, thereby minimizing, for example, driver distraction and allowing the occupant to utilize various features of the vehicle.

SUMMARY

This section provides a general summary of the disclosure, and is not a comprehensive disclosure of its full scope or all of its features.

The present disclosure provides for an image capturing system for a vehicle. The image capturing system captures an image of a target area based on a predefined gesture performed by an occupant of the vehicle. The image capturing system includes: a gesture capture device, an eye tracking device, an on-board camera, a target area determination module, and a memory unit.

The gesture capture device determines a gesture position of a gesture performed by the occupant. The gesture is the predefined gesture and the gesture position is determined with respect to a reference point. The eye tracking device determines an eye position of the occupant based on a viewpoint of the occupant.

The on-board camera is disposed along a body of the vehicle and captures an image of the target area which is within an image field-of-view of the on-board camera. The target area determination module determines a target vector extending from the eye position toward the gesture position and aligns the on-board camera with the target vector, such that the target vector passes through the image field-of-view. The memory unit which is a computer readable medium stores the image of the target area captured by the on-board camera.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

The present disclosure will now be described more fully with reference to the accompanying drawings. An example of a vehicle system 100 including an image capturing system 110 of the present disclosure is now presented. The image capturing system 110 is disposed within a vehicle. The image capturing system 110 captures an image of a target area based on a gesture performed by an occupant of the vehicle. The image may then be, for example, displayed on a display and/or transmitted to a portable device such as a cellular phone or a tablet computer. While in the example embodiment the image capturing system 110 captures an image of the target area, the image capturing system 110 may also capture, for example, a point cloud, a radar signature, or other suitable formats.

Figure 1:
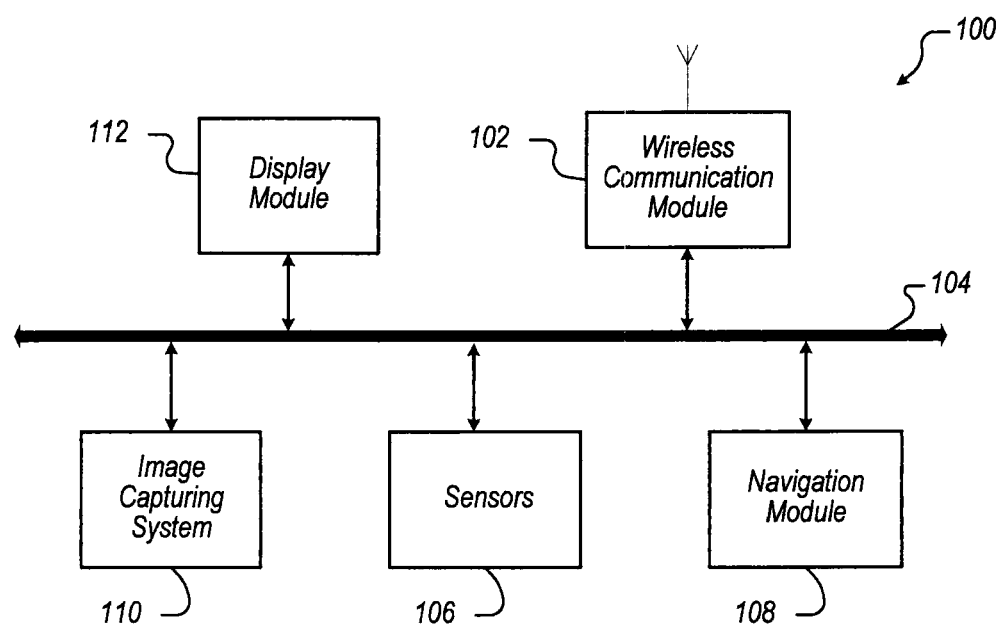
FIG. 1 is a functional block diagram of a vehicle system.
Figure 2:
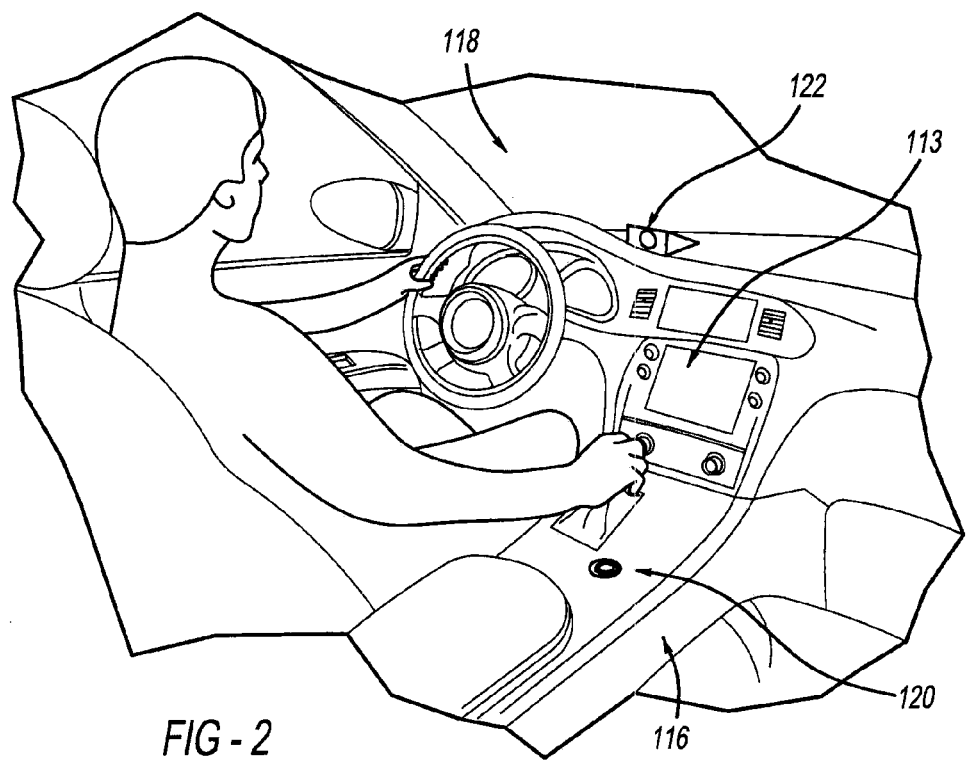
FIG. 2 illustrates an occupant in a vehicle with a gesture capture device and an eye tracking device of an image capturing system of the vehicle.

Referring now to FIGS. 1 and 2, an example of the vehicle system 100 of the vehicle is presented. The vehicle system 100 includes a wireless communication module 102, various sensors 106, a navigation module 108, the image capturing system 110, and a display module 112. The modules of the vehicle system 100 are communicably coupled via a communication network, such as a controller area network (CAN) 104.

The wireless communication module 102 receives and transmits information wirelessly. The wireless communication module 102 may communicate with, for example, satellite networks, terrestrial wireless networks, short range wireless networks such as Bluetooth networks, and/or other suitable types of wireless communication networks. The wireless communication module 102 enables the vehicle to perform, for example, vehicle-to-vehicle communication, vehicle-to-server communication, etc. The wireless communication module 102 may also transmit information received from modules via the CAN 104. For example, the wireless communication module 102 may transmit data files, such as images, to a portable device within the vehicle or to a data server external of the vehicle.

The CAN 104 may also be referred to as a car area network. The CAN 104 may include one or more data buses. Various parameters read by a given control module may be made available to other modules via the CAN 104. While the communication network is provided as CAN 104, other suitable networks may also be used to communicably couple the modules, such as local interconnect network (LIN).

Various sensors 106 disposed within the vehicle may transmit information to other modules via the CAN 104. For example, the sensors 106 may include a speed sensor that determines the velocity of the vehicle, a photosensor that determines the amount of light outside of the vehicle, and/or a fog sensor that determines it is foggy.

A navigation module 108 may include a global position system (GPS) and determines a location of the vehicle. The navigation module 108 may further determine other information such as an altitude at which the vehicle is traveling, a travel direction of the vehicle, and/or a road on which the vehicle is traveling. The navigation module 108 may provide the information to other modules via the CAN 104.

The display module 112 displays information on a display 113. In the example embodiment, the display 113 is provided as a liquid crystal display disposed above a center console 116 of the vehicle (FIG. 2). The display 113 may include a touch screen for allowing the occupant to, for example, access and control various vehicular systems, such as navigation system, climate control system, and/or audio/visual system. Alternatively, the display may be, for example, a projection system that projects images onto a windshield 118 of the vehicle. For example, the display module 112 may be a heads-up display.

Figure 3:
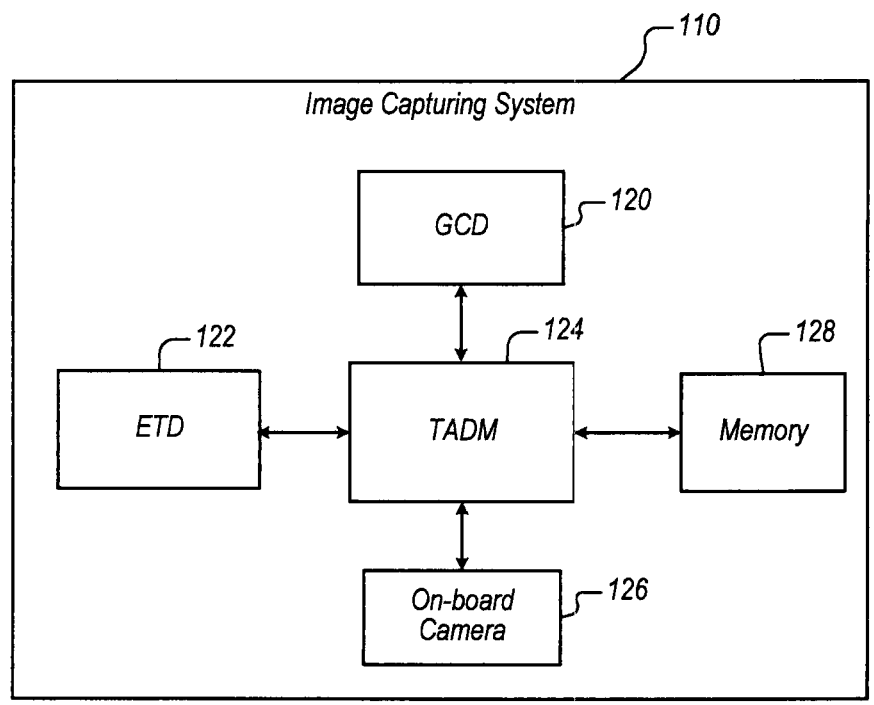
FIG. 3 is a functional block diagram of the image capturing system.

With reference to FIG. 3, an example of the image capturing system 110 is now presented. The image capturing system 110 includes a gesture capture device (GCD) 120, an eye tracking device (ETD) 122, a target area determination module (TADM) 124, an on-board camera 126, and memory 128.

Figure 5:
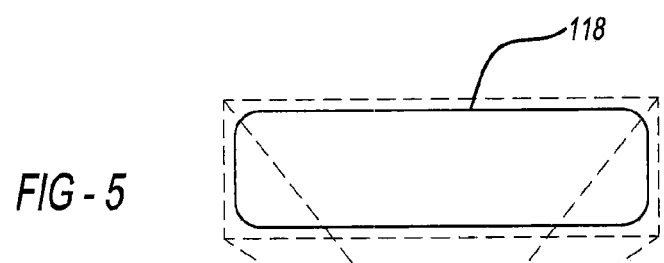
FIG. 5 illustrates a front view of a space captured by the capture device.
Figure 6:
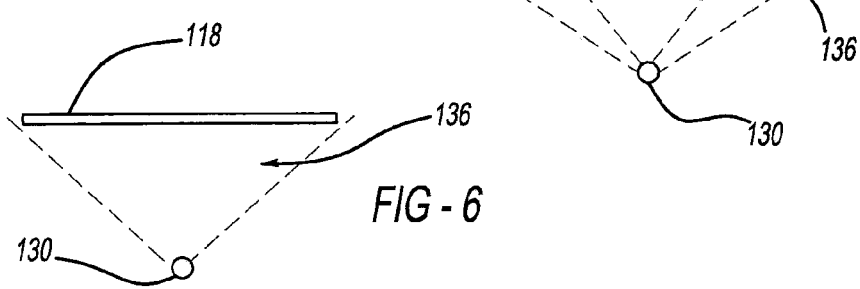
FIG. 6 illustrates a top view of the space captured by the gesture camera.
Figure 4:
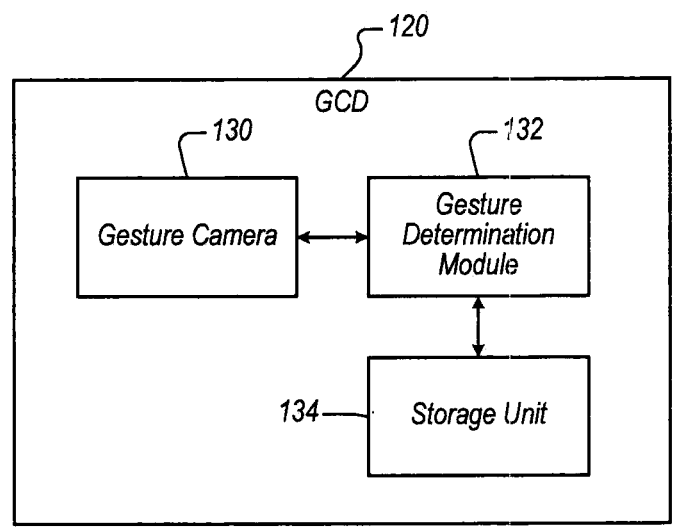
FIG. 4 is a functional block diagram of the gesture capture device.

With reference to FIGS. 4-8, an example of the GCD 120 is presented. The GCD 120 captures and identifies gestures performed by the occupant. The GCD 120 includes a gesture camera 130, a gesture determination module 132, and a storage unit 134. The gesture camera 130 continuously monitors a space 136 in front of the windshield 118 of the vehicle (FIGS. 5-6). The gesture camera 130 captures movement of an object within the space 136. For example, the gesture camera 130 may capture a movement or a gesture performed by the occupant within the space 136 such as the occupant pointing with a finger, waving a hand, performing a tapping motion, and/or pointing and circling with a finger.

In the example embodiment, the gesture camera 130 is disposed at the center console 116 of the vehicle. In an alternative embodiment, the gesture camera 130 may be disposed at the ceiling of the passenger cabin of the vehicle above the occupant. Furthermore, the gesture camera 130 may include one or more cameras that are arranged to capture the space 136 in front of the windshield 118 where the space 136 is defined by a field of view of the gesture camera(s). Although the space 136 is depicted as an area within the dotted lines of FIGS. 5 and 6, it would be appreciated by one skilled in the art that the space 136 may have various configurations and is not limited to the one shown in the figures.

The gesture determination module 132 receives images of the movement captured by the gesture camera 130. Using various suitable techniques, the gesture determination module 132 identifies the movement captured. Specifically, the gesture determination module 132 determines whether the movement is of a predefined gesture. The gesture determination module 132 may track and/or outline the movement captured and compare the movement with gestures defined and stored in the storage unit 134.

The storage unit 134, which is computer-readable medium, stores predefined gestures and corresponding commands that are performed when the predefined gesture is performed by the occupant. For example, the storage unit 134 stores the predefined gesture that is to be performed by the occupant for capturing an image via the on-board camera 126. In the example embodiment, the predefined gesture is provided as a circular motion of an object such as a finger, as depicted as gesture "G" in FIG. 7. It would be appreciated by one skilled in the art that the predefined gesture may be another gesture, such as a pointing and tapping movement, and is not limited to the circular motion. In addition, the storage unit 134 may associate multiple predefined gestures that correspond to the command of capturing an image via the on-board camera 126, or to other commands like selecting an image being displayed on the windshield 118 by the display module 112.

Figure 7:
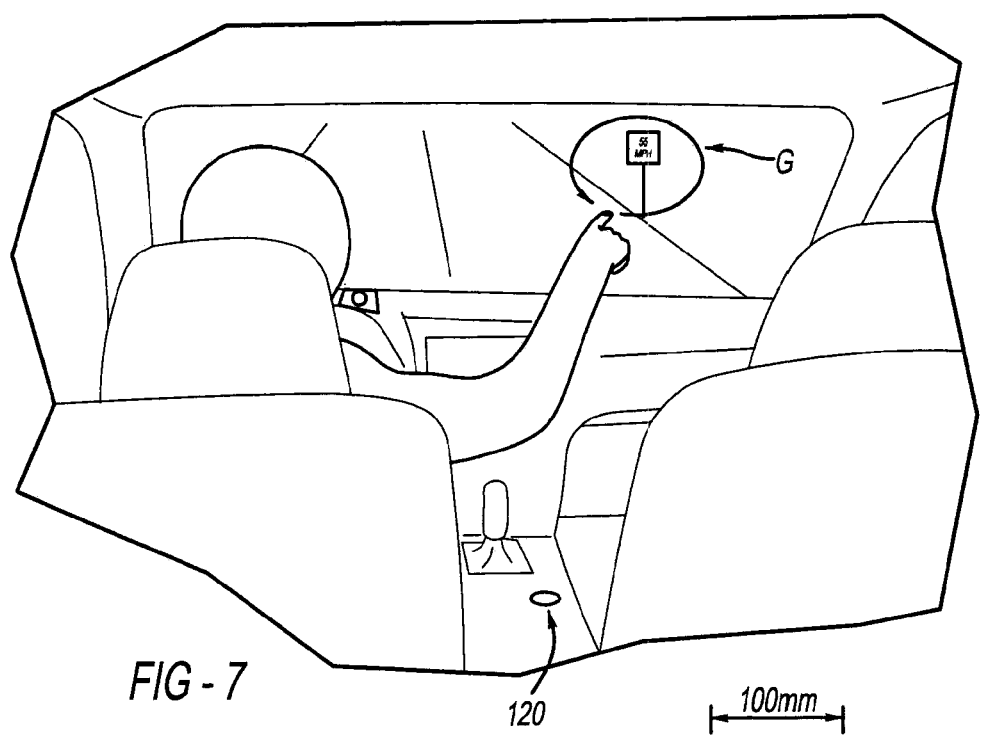
FIG. 7 illustrates a gesture performed by the occupant.
Figure 8:
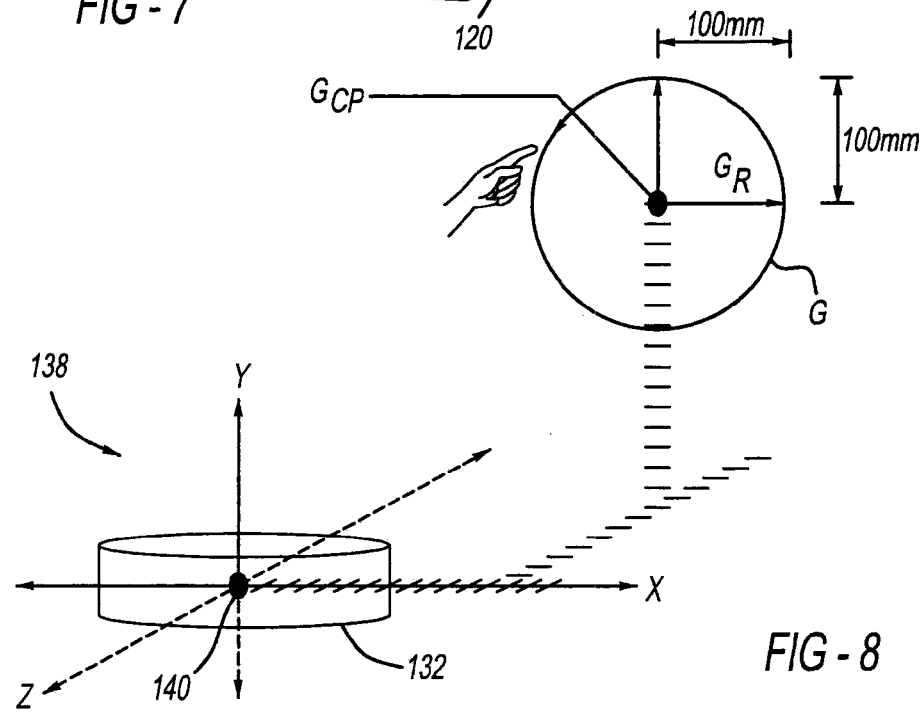
FIG. 8 illustrates a positional relationship between the gesture captured and a reference point.

Once the gesture performed by the occupant is identified as the predefined gesture, the gesture determination module 132 determines various parameters of the gesture. By way of explanation, as shown in FIGS. 7 and 8, the gesture determination module 132 determines a size and positional relationship of a gesture G which is identified as the predefined gesture for capturing an image. The gesture determination module 132 determines a center point $G_{CP}$ and a radius $G_R$ of the gesture G. In the example of FIG. 8, the radius is determined as 100 mm which is provided for explanation purposes only and may be another value. The gesture determination module 132 then determines a position of the center point $G_{CP}$ with respect to a reference point 140 which is the origin of a world coordinate system 138. The position of the center point $G_{CP}$ may be referred to as a center point position ($G_{CPP}$). In the example embodiment, the reference point 140 is defined as a position of the gesture camera 130 which is predetermined. The gesture determination module 132 determines the center point position with respect to the reference point 140 as $G_{CPP}=G_X, G_Y, G_Z$.

The gesture determination module 132 and the storage unit 134 may be disposed with the gesture camera 130.

Alternatively, the gesture determination module 132 and the storage unit 134 may be disposed separately from the gesture camera 130. It would be appreciated by one skilled in the art that the reference point 140 is not limited as the position of the gesture camera 130 and may be set as other points. Thus, the gesture determination module 132 may include predefined positional relationships between the gesture camera 130 and the reference point 140 for determining the center point position $G_{CPP}$ with respect to the reference point 140.

Figure 9:
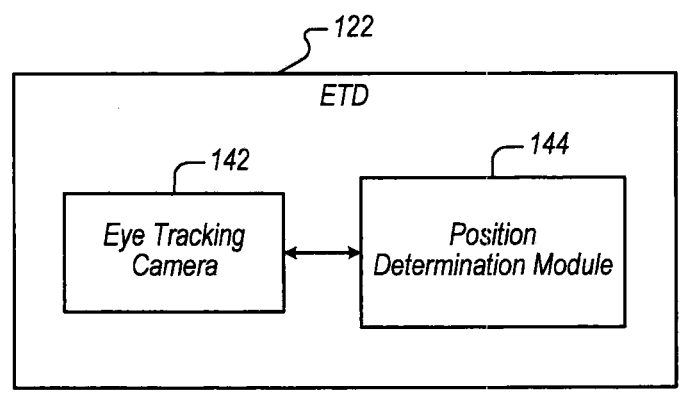
FIG. 9 is a functional block diagram of the eye tracking device.
Figure 10:
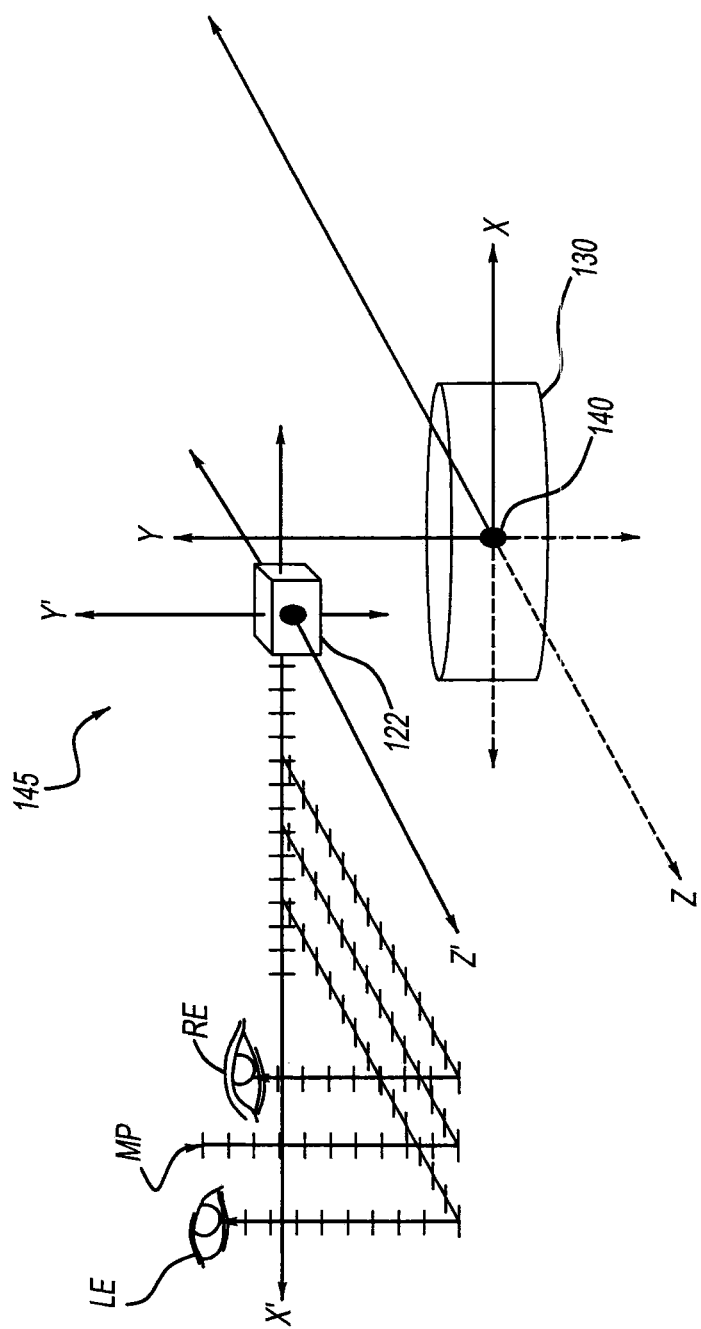
FIG. 10 illustrates a positional relationship between an eye position, the eye tracking device, and the reference point.

With reference to FIGS. 9 and 10, an example of the ETD 122 is presented. The ETD 122 determines a position of the occupant's eye relative to the ETD 122. The position of the eye (i.e., eye position (E)) may be determined for a right eye ($E_R$), a left, eye ($E_L$), or a mid-point ($E_M$). In FIG. 10, the right eye is referenced as RE, the left eye is referenced as LE, and the midpoint is referenced as MP.

To properly determine the eye position, a viewpoint of the occupant is determined. Specifically, whether the occupant is utilizing a right eye, a left eye, or both eyes determines a viewpoint of the occupant. For example, when the occupant uses both the right eye and the left eye, the view of the occupant is a combination of two viewpoints: one from the right eye and one from the left eye. Thus, the viewpoint of the occupant is provided as a midpoint between the right eye and left eye, and the eye position is determined as the mid-point ($E=E_M$). Alternatively, when the occupant uses one eye (right eye or left eye), the viewpoint of the occupant is from the one eye, and the eye position is determined as the position of the one eye ($E=E_R$ or $E_L$).

With reference to FIG. 9, the ETD 122 includes an eye tracking camera 142 and a position determination module 144. The eye tracking camera 142 provides information to the position determination module 144. The position determination module 144 determines which eye the occupant is using and the eye position.

Various suitable cameras may be implemented as the eye tracking camera 142. For example, the eye tracking camera 142 may be an infrared camera that transmits an infrared signal toward the occupant and receives a signal that is reflected back by the occupant's pupil. The reflected signal may be provided to the position determination module 144. The position determination module 144 determines the viewpoint and the eye position using known eye detection method. Alternatively, the eye tracking camera 142 may capture an image of the occupant's face and transmit the image to the position determination module 144. Based on known facial recognition techniques, the position determination module 144 determines the viewpoint and the eye position of the occupant.

In the example embodiment, the ETD 122 is disposed at a dashboard of the vehicle (FIG. 2). Alternatively, the ETD 122 may be disposed in a meter gauge of an instrument panel of the vehicle or other suitable areas from which the ETD 122 may detect facial features of the occupant. The ETD 122 may include one or more cameras. Although the example embodiment depicts one eye tracking device in front of a driver, multiple eye tracking devices may be implemented for tracking the eye position of other occupants such as front and rear passengers. For example, one eye tracking device may be used to capture the driver and another eye tracking device may be used to capture a front passenger.

The position determination module 144 receives the information from the eye tracking camera 142 and determines the eye position relative to the ETD 122. In particular, in the example embodiment the position determination module 144 determines whether the occupant is utilizing both the left and the right eye, only the right eye, or only the left eye (i.e., determines the viewpoint). Subsequently, the position determination module 144 determines the eye position with respect to the ETD 122 which is the origin of a local coordinate system 145 (FIG. 10). The eye position is provided as $E=E_X, E_Y, E_Z$.

If the occupant is only using the right eye, the position determination module 144 determines the position of the right eye with respect to the ETD 122 as the eye position ($E=E_R=E_{RX}, E_{RY}, E_{RZ}$). If the occupant is only using the left eye, the eye position determination module 144 determines the position of the left eye with respect to the ETD 122 as the eye position ($E=E_L=E_{LX}, E_{LY}, E_{LZ}$). If the occupant uses the left eye and the right eye, the eye position determination module 144 determines the position of the midpoint with respect to the ETD 122 as the eye position ($E=E_M=E_{MX}, E_{MY}, E_{MZ}$).

In addition to the eye position, the ETD 122 may also determine a gaze direction of the eye. The gaze direction may be used to further determine the direction that the occupant is gesturing toward. In lieu of or in addition to the gaze direction, the ETD 122 may also determine a head direction of the occupant which indicates the direction the occupant's head is turned toward.

In the example embodiment, the TADM 124 captures an image of a target area 146 via the on-board camera 126. The on-board camera 126 is disposed on the vehicle and may be a video camera that captures series of images. The images are stored in the memory 128 which is a computer-readable medium. The on-board camera 126 has a field-of-view 148 that can be adjusted to capture an image of the target area 146. Specifically, a focal vector 152 of the on-board camera 126 which reflects a direction that the on-board camera 126 is directed toward may be adjusted to align the field-of-view 148 toward the target area 146. The on-board camera 126 may include an adjustable focal length for zooming in/out within a preset threshold and may also adjust the size of the field-of-view 148 (increase/decrease).

The TADM 124 may further adjust features of the on-board camera 126 to ensure the quality of the image. For example, based on a vehicle speed, vehicle direction, road profile (e.g., curved road, straight road, hilly road), or environmental conditions (e.g., rain, fog, availability of daylight, etc.), the TADM 124 adjusts the shutter speed, the exposure, and other imaging features of the on-board camera 126. The TADM 124 may receive such information from other modules, such as the sensors 106 and the navigation module 108, via the CAN 104.

In the example embodiment, the on-board camera 126 is disposed at a fender of the vehicle. It would be appreciated by one skilled in the art that the on-board camera 126 may be disposed in various other suitable positions of the vehicle (e.g., within the passenger cabin, side mirror, etc.). In addition, more than one on-board camera 126 can be utilized by the image capturing system 110. For example, multiple cameras may be disposed around the vehicle and the TADM 124 may select the appropriate camera for capturing the image based on a target vector 150 determined by the TADM 124, which is described in detail below.

The TADM 124 determines the target area 146 based on the eye position and the gesture performed by the occupant. Specifically, the TADM 124 determines the target vector 150 which reflects a direction that the occupant has gestured toward (gesture direction). The target vector 150 extends from the eye position toward the gesture center point $G_{CP}$ (i.e., gesture position).

Using the eye position from the ETD 122, the TADM 124 determines a calibrated eye position (CE) with respect to the reference point 140. The TADM 124 may use a predefined positional relationship between the ETD 122 and the reference point 140 to translate the coordinates of the eye position received from the ETD 122 to the world coordinate system 138 by simple coordinate conversion. For example, if the position of the ETD 122 with respect to the reference point 140 is $ETD_X$, $ETD_Y$, $ETD_Z$, the calibrated eye position with respect to the reference point 140 may be determined as $CE=(CE_X, CE_Y, CE_Z)=(ETD_X+E_X, ETD_Y+E_Y, ETD_Z+E_Z)$. Subsequently, the TADM 124 determines the target vector 150 between the calibrated eye position and the gesture center point $G_{CP}$. For example, the target vector 150 may be calculated as $G_{CPP}-CE=G_X-CE_X, G_Y-CE_Y, G_Z-CE_Z$.

Based on the viewpoint of the occupant which is determined by the ETD 122, the calibrated eye position for the right eye is $CE_R=(CE_{RX}, CE_{RY}, CE_{RZ})=(ETD_X+E_{MX}, ETD_Y+E_{RY}, ETD_Z+E_{RZ})$. Similarly, the calibrated eye position of the left eye is $CE_L=(CE_{LX}, CE_{LY}, CE_{LZ})=(ETD_X+E_{LX}, ETD_Y+E_{LY}, ETD_Z+E_{LZ})$, and the calibrated eye position of the midpoint is $CE_M=(CE_{MX}, CE_{MY}, CE_{MZ})=(ETD_X+E_{MX}, ETD_Y+E_{MY}, ETD_Z+E_{MZ})$. In the example embodiment, the TADM 124 determines the calibrated eye position with respect to the reference point 140. Alternatively, the ETD 122 may determine the calibrated eye position and transmit the calibrated eye position to the TADM 124.

Based on the target vector 150, the TADM 124 aligns the on-board camera 126. For example, the TADM aligns the focal vector 152 of the onboard camera 126 with the target vector 150. Using the target vector 150 and the focal vector 152, the TADM 124 determines a shift vector 154 which represents the difference between the focal vector 152 of the on-board camera 126 and the target vector 150. The TADM 124 then shifts the field-of-view 148 in accordance with the shift vector 154, so that the focal vector 152 of the on-board camera 126 aligns with the target vector 150. By adjusting the focal vector 152, the target vector 150 passes through the field-of-view 148 and the field-of-view 148 is aligned with the target area 146.

Figure 11:
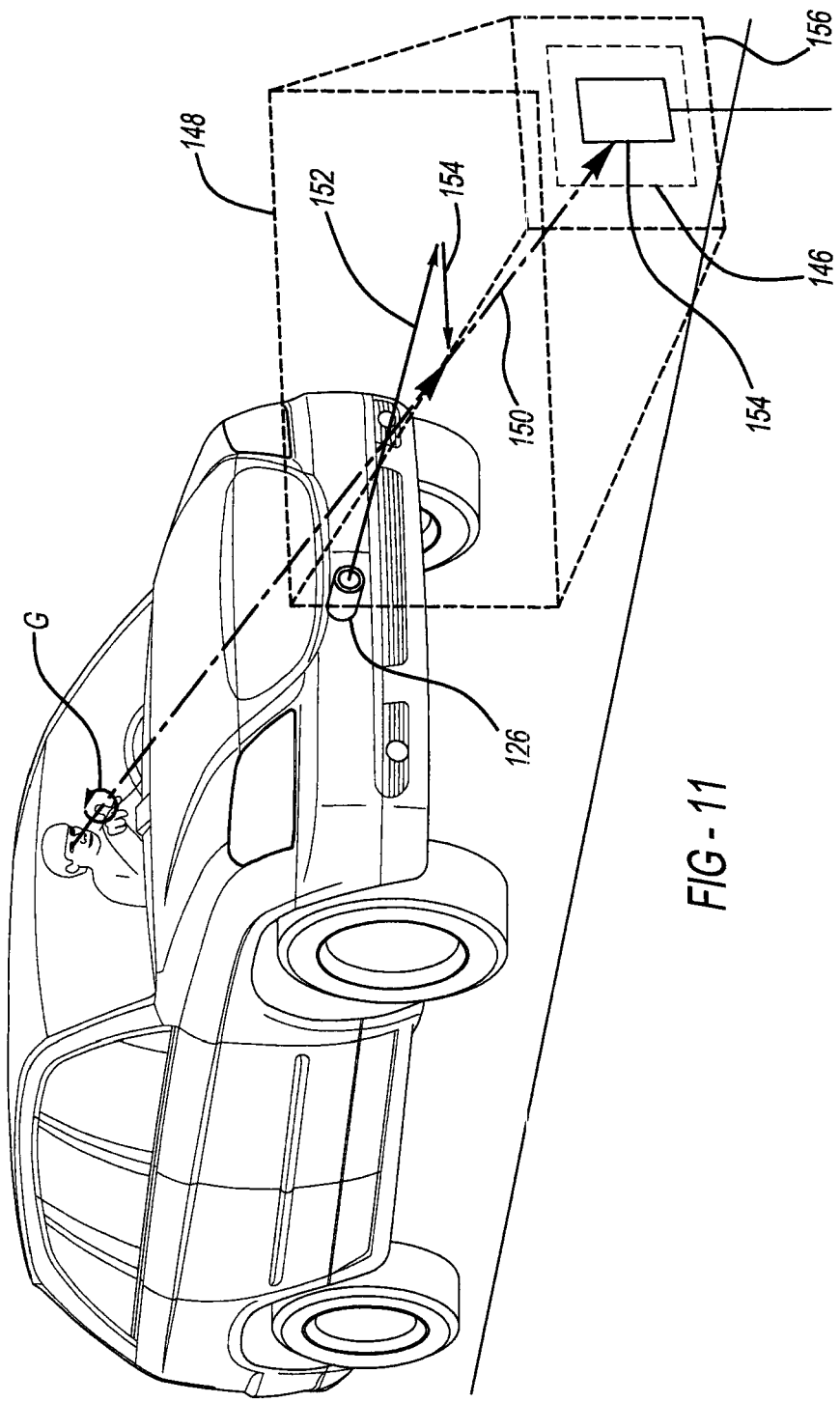
FIG. 11 illustrates a target vector and a target area to be captured by an on-board camera based on the gesture and eye position.

The TADM 124 may also adjust the zoom and the size of the field-of-view 148. The TADM 124 may control the zoom and the size based on the size of the gesture which may be determined by the radius $G_R$ of the gesture. For example, the TADM 124 may store a table that defines corresponding zoom parameters for various radii. Alternatively, the TADM 124 may determine the zoom and size of the field-of-view 148 based on an object detected within the field-of-view 148 by the on-board camera 126 after the on-board camera 126 is aligned. For example, as shown in FIG. 11, using known detection methods, the on-board camera 126 may detect a sign 153 as an object within the field-of-view 148. Furthermore, using known sizing methods, the on-board camera 126 may then adjust the zoom and the size of the field-of-view 148 to capture a target size 156. The target size 156 is adjusted such that it includes the sign 153 and the focal vector 152 which is aligned with the target vector 150.

Figure 12:
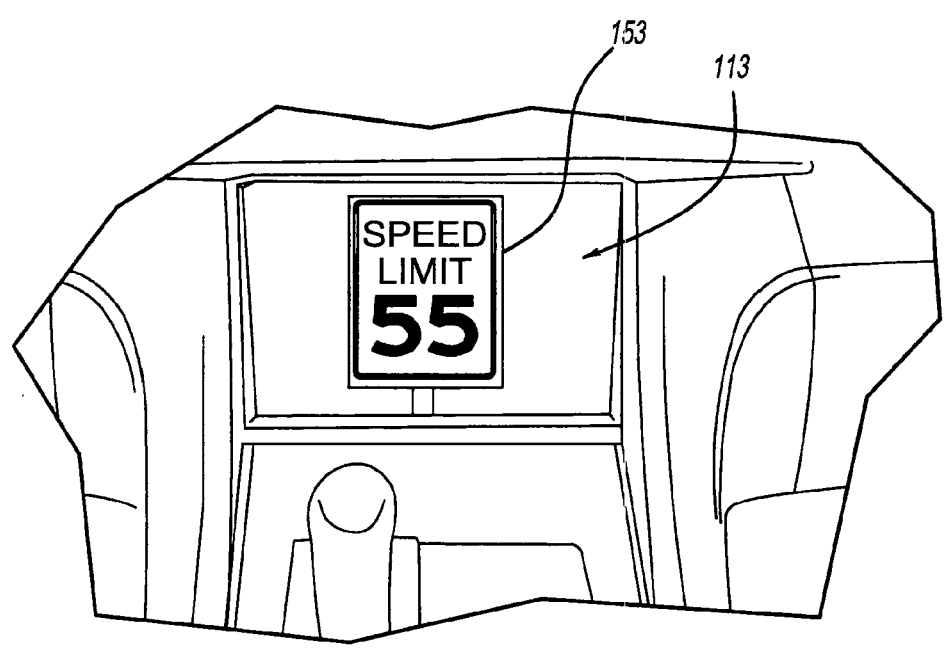
FIG. 12 illustrates an image captured by the on-board camera being displayed on a display.

After aligning the focal vector 152 and adjusting the field-of-view 148, the on-board camera 126 captures a series of images of the target area 146. The images may then be stored in the memory 128. The TADM 124 may select one of the images captured and transmit the image to the display module 112 which displays the image on the display 113 as shown in FIG. 12. The TADM 124 may select one of the images based on, for example, the quality of the images, such that the image with the best quality is displayed. The TADM 124 may also display all the images via the display module 112.

In lieu of or in addition to transmitting the image(s) to the display module 112, the TADM 124 may transmit the image(s) via the wireless communication module 102 to a portable device (not shown) or to a data server. The TADM 124 may also display a message to the occupant via the display module 112 inquiring as to whether, for example, the occupant would like to display the image, have the image sent to the portable device, and/or have the image sent to the data server.

In the example embodiment, the image capturing system 110 is described with reference to a single occupant whose gesture and eye position is detected and recognized. Alternatively, the image capturing system 110 may be configured to monitor and recognize the gesture and eye position of more than one occupant of the vehicle. For example, the image capturing system 110 may determine which occupant performed the gesture, and then use the eye position of the occupant to determine the target vector 150.

Figure 13:
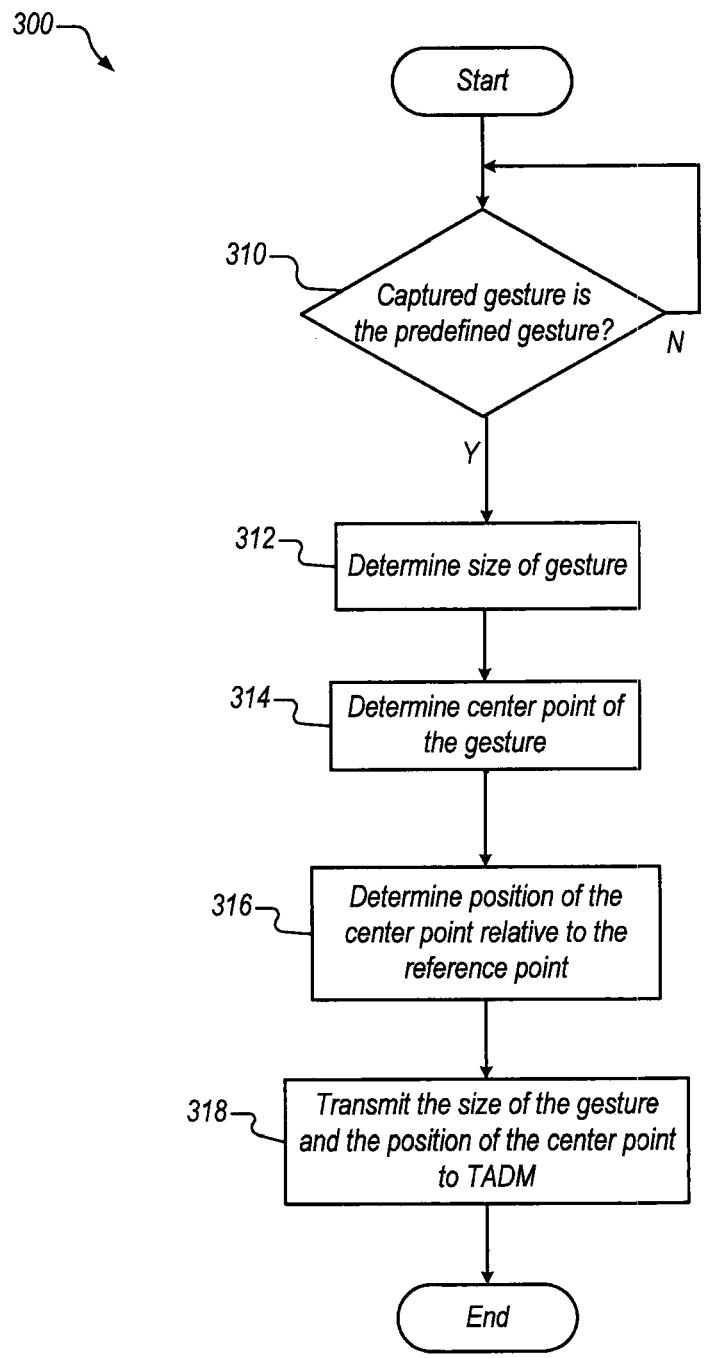
FIG. 13 is a flowchart of an example method for analyzing a gesture.
Figure 14:
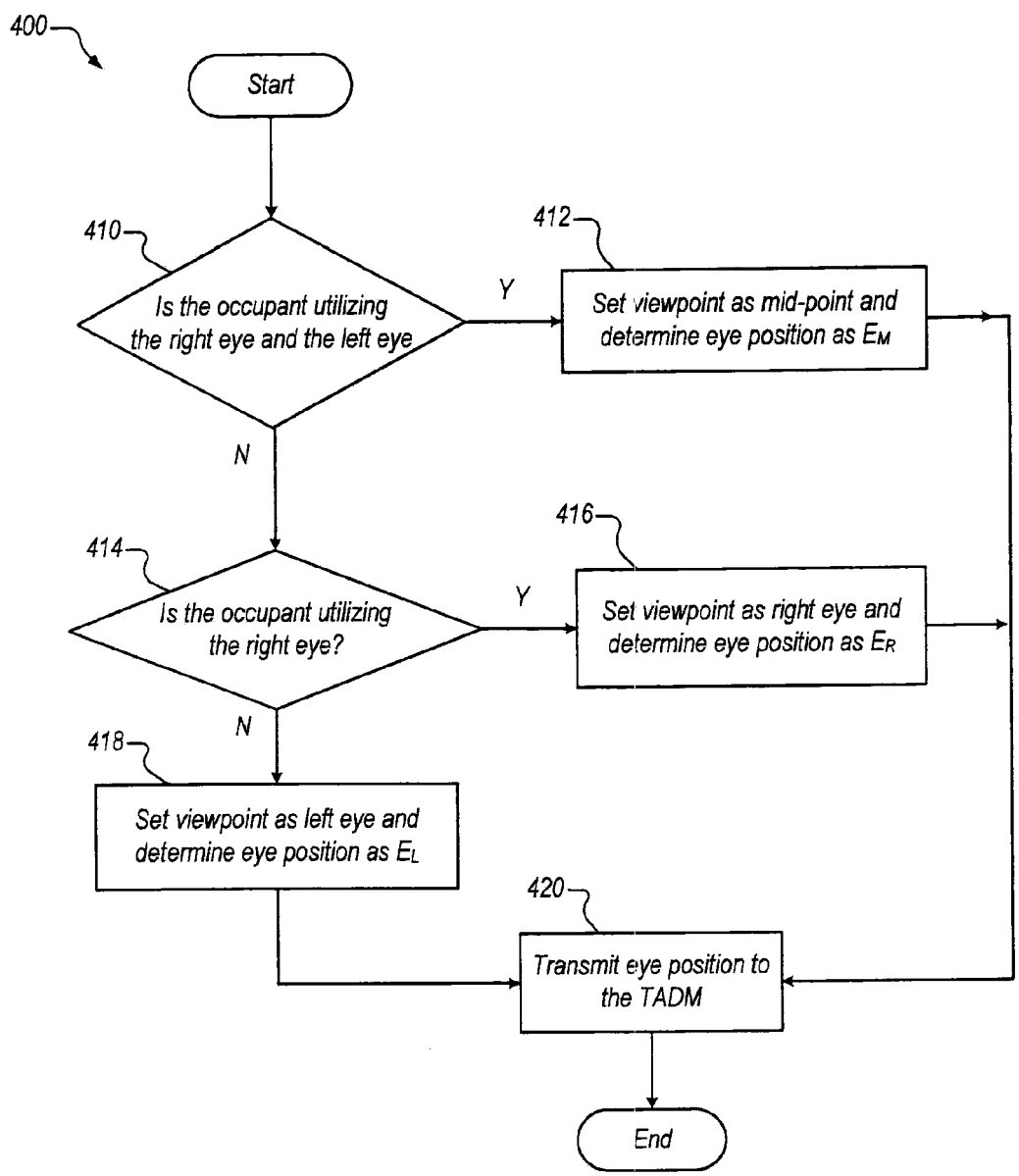
FIG. 14 is a flowchart of an example method for determining the eye position.
Figure 15:
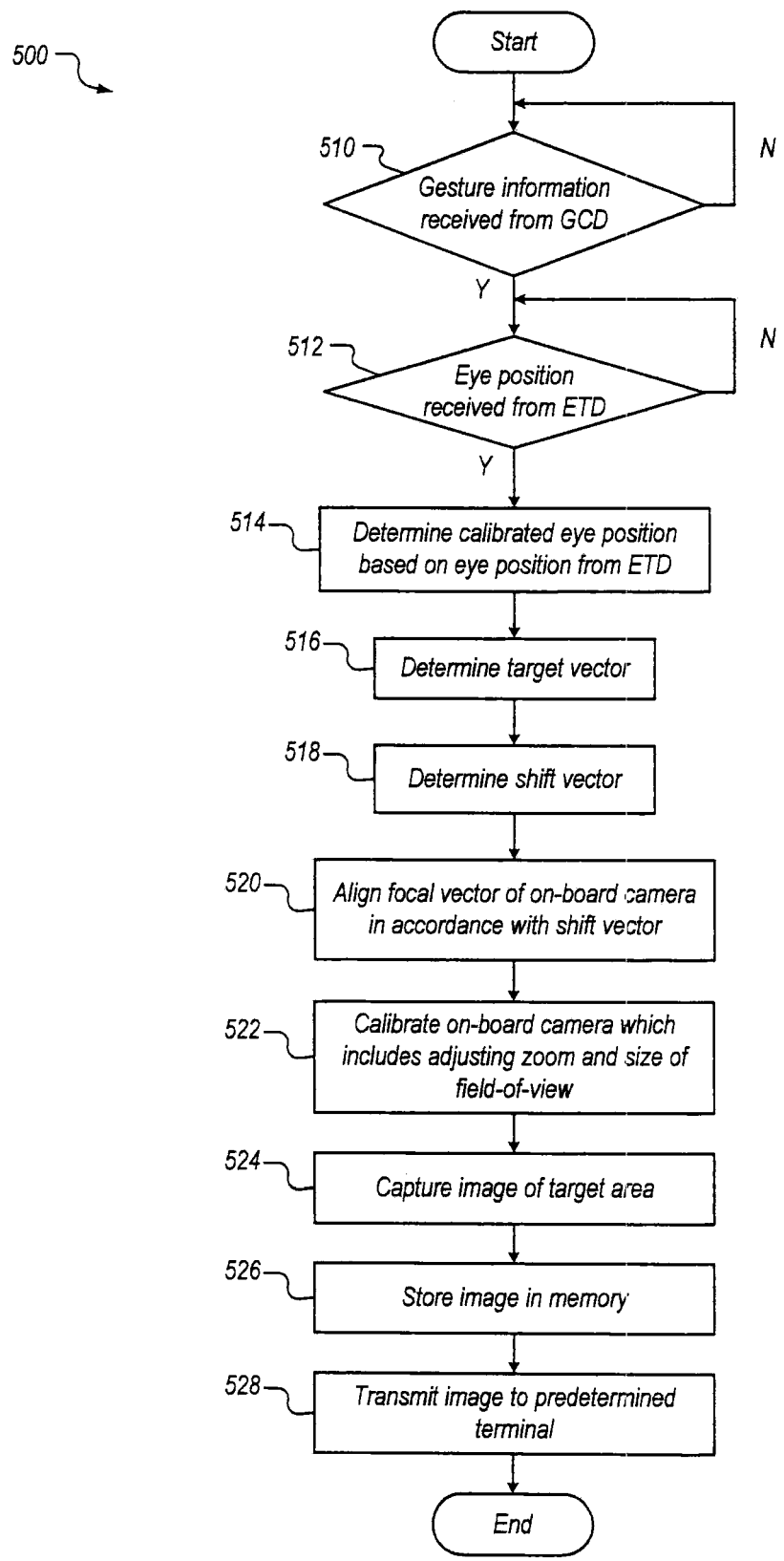
FIG. 15 is a flowchart of an example method for capturing an image based on the gesture and the eye position.
Figure 16:
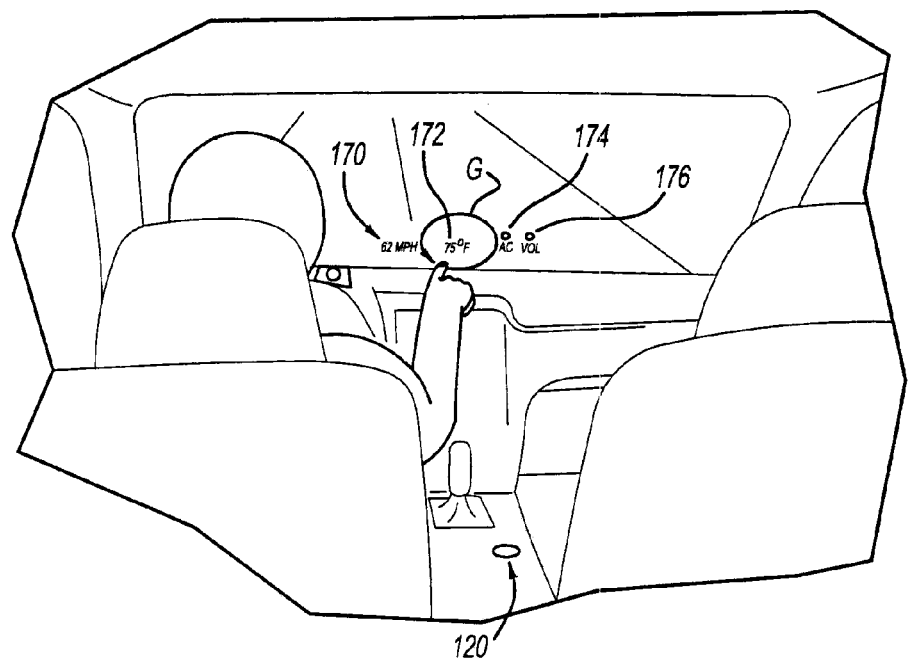
FIG. 16 illustrates images displayed along a windshield and a gesture performed by the occupant.
Figure 17:
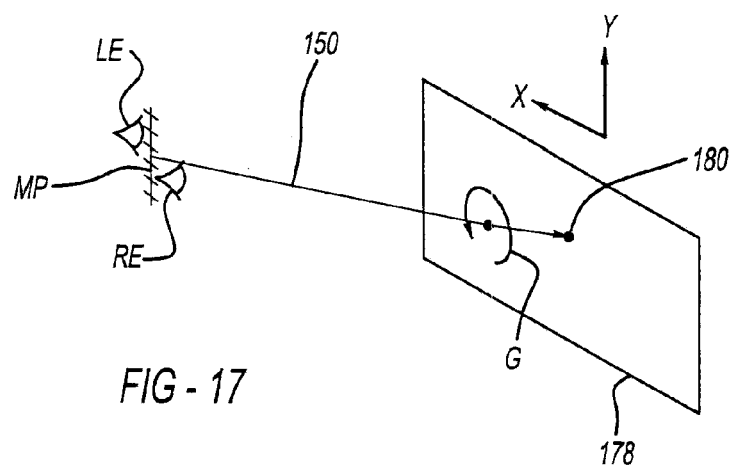
FIG. 17 illustrates a target vector intersecting a plane at a target position.

With reference to FIGS. 13-15, an exemplary illustration of the image capturing system 110 is now presented. With reference to FIG. 13, a flowchart of an example method 300 performed by the GCD 120 for analyzing a gesture is presented. At 310 the GCD 120 determines whether a gesture captured by the gesture camera 130 is the predefined gesture stored in the storage unit 134 for capturing an image. For example, the GCD 120 determines whether the gesture performed by the occupant is a circular movement. If the gesture captured is not of the predefined gesture, the GCD 120 remains at 310.

If the gesture captured is the predefined gesture, the GCD 120 determines a size and a center point of the gesture outlined by the occupant at 312 and 314, respectively. For example, as shown in FIG. 8, the GCD 120 may determine the center point $G_{CP}$ and the radius $G_R$ of the circle outlined by the occupant. The GCD 120 then determines at 316 a position of the center point relative to the reference point 140 (i.e., the center point position ($G_{CPP}$)). The GCD 120 then transmits the size of the gesture and the center point position to the TADM 124 at 318.

With reference to FIG. 14, a flowchart of an example method 400 performed by the ETD 122 for determining the eye position is presented. At 410 the ETD 122 determines whether the occupant is utilizing both eyes (i.e., the right eye and the left eye). If the occupant is utilizing both eyes, the ETD 122, at 412, sets the viewpoint as the midpoint and determines the eye position from the midpoint ($E=E_M$). For example, the ETD 122 determines the position of the midpoint with respect to the ETD 122 as $E_M=(E_{MX}, E_{MY}, E_{MZ})$.

If the occupant is not using both eyes (410 is false), then the ETD 122 determines, at 414, whether the occupant is using the right eye. If the occupant is only using the right eye, the ETD 122, at 416, sets the viewpoint as the right eye and determines the position of the right eye ($E=E_R$). For example, the ETD 122 determines the position of the right eye with respect to the ETD 122 as $E_R=(E_{RX}, E_{RY}, E_{RZ})$.

If the occupant is not using the right eye (414 is false), the ETD 122, at 418, sets the viewpoint as the left eye and determines the position of the left eye ($E=E_L$). For example, the ETD 122 determines the position of the left eye with respect to the ETD 122 as $E_L=(E_{LX}, E_{LY}, E_{LZ})$. Once the ETD 122 determines the eye position ($E_M$ or $E_R$, or $E_L$), the ETD 122 transmits the eye position to the TADM 124 at 420.

With reference to FIG. 15, a flowchart of an example method 500 performed by the TADM 124 for capturing an image is presented. At 510, the TADM 124 determines whether information, such as the center point position and the size of the gesture, have been received from the GCD 120. If 510 is false, the TADM 124 remains at 510. If 510 is true, the TADM 124 proceeds to 512.

At 512 the TADM 124 determines whether the eye position has been received from the ETD 122. If 512 is false, the TADM 124 remains at 512. If 512 is true, the TADM 124 translates the eye position into the world coordinate system at 514. As described above, the eye position received from the ETD 122 is the eye position relative to the ETD 122. TADM 124 determines the eye position relative to the reference point 140 of the world coordinate system 138 as the calibrated eye position.

The TADM 124 then determines, at 516, the target vector 150 based on the gesture center point and the calibrated eye position. At 518 the TADM 124 determines the shift vector 154 based on the target vector 150 and the focal vector 152 of the on-board camera 126. The TADM 124 then, at 520, aligns the on-board camera 126 per the shift vector 154.

At 522 the TADM 124 calibrates the on-board camera 126 to ensure the quality of the image captured. For example, the TADM 124 may adjust imaging parameters of the on-board camera 126, such as zoom and size of the field-of-view 148, shutter speed, exposure, and other imaging features. Once the on-board camera 126 is aligned and calibrated, the on-board camera 126 captures a series of images of the target area 146 at 524. The TADM 124 stores the images in the memory 128 at 526, and may transmit the image(s) at 528 to a predetermined terminal, such as the display module 112 which displays the image(s) on the display 113. The TADM 124 may also transmit the image(s) to a portable device via the wireless communication module 102.

Using gesture and eye recognition, the image capturing system 110 captures an image of an object external of the vehicle based on a gesture performed by the occupant. The image capturing system 110 allows the occupant to capture the image without having to filter through, for example, a menu on a display screen which may be time consuming. In particular, as the occupant filters through the menu, the vehicle may already pass the object the occupant intended to capture, whereas the image capturing system 110 allows the occupant to capture the image at the time the occupant sees the object by performing the predefined gesture. Furthermore, when the occupant is the driver, the image capturing system 110 minimizes distractions and still allows the driver to control the on-board camera 126 by performing the predefined gesture.

In the example embodiment, the image capturing system 110 is utilized to capture an image of, for example, an object external of the vehicle. Alternatively, the image capturing system 110 may be utilized to determine a position on the display based on the gesture performed. With reference to FIGS. 16-19, the display module 112 may be a projection system, such as a heads-up display. As a heads-up display, the display module 112 may display images representing information and/or control gauges of various vehicle systems along, for example, the windshield 118. The information displayed may include, for example, vehicle speed, temperature, climate control gauge, and/or audio control.

The display module 112 may store predetermined controls that relate to each of the images displayed. Specifically, if an image is selected by the occupant, the display module 112 determines what control function is available. For example, if the temperature image is selected, the predetermined control associated with the temperature image may increase or decrease the size of the image being displayed. As another example, if the climate control gauge is selected, the predetermined control may permit the user to adjust the climate system via the displayed gauge.

The windshield 118 of the vehicle can be viewed as a two dimensional plane. The display module 112 may store a correlating map representative of the windshield 118 as a plane. The correlating map may indicate the position of the various information and/or control gauges being displayed along the plane.

The image capturing system 110 may be utilized to determine a target position on the plane that is selected by the occupant based on the gesture performed. For example, with reference to FIG. 16, the display module 112 displays images 170, 172, 174, and 176. The occupant may perform a gesture G. The GCD 120 and the ETD 122 perform in the same manner as described above. For example, the GCD 120 determines whether the gesture is the predefined gesture. When the gesture is the predefined gesture, the GCD 120 determines the center point and size of the gesture. The ETD 122 determines the view point and the eye position of the occupant.

The TADM 124 performs substantially the same as described above. Specifically, the TADM 124 determines the target vector 150 based on the information from the GCD 120 and the ETD 122. Subsequently, the TADM 124 determines where the target vector 150 intersects the plane. For example, with reference to FIG. 17, a plane 178 representative of the windshield 118 is depicted. The plane 178 may be stored in the memory 128. More particularly, the plane 178 may be the correlating map which is also stored by the display module 112. Alternatively, the memory 128 may store a simple map which is representative of the windshield 118 but does not include the position of the images being displayed.

As described above, the TADM 124 determines the target vector 150 which extends from the eye position toward the gesture center point. Using well known plane-vector algorithms, the TADM 124 determines the target position at which the target vector 150 intersects the plane 178 (i.e., the correlating map/simple map). For example, the TADM 124 determines the position of intersection 180 along the plane 178 which is in the x-y coordinate system as the target position. Various suitable algorithms may be utilized for calculating the position of the intersection 180 on the plane 178.

Figure 18:
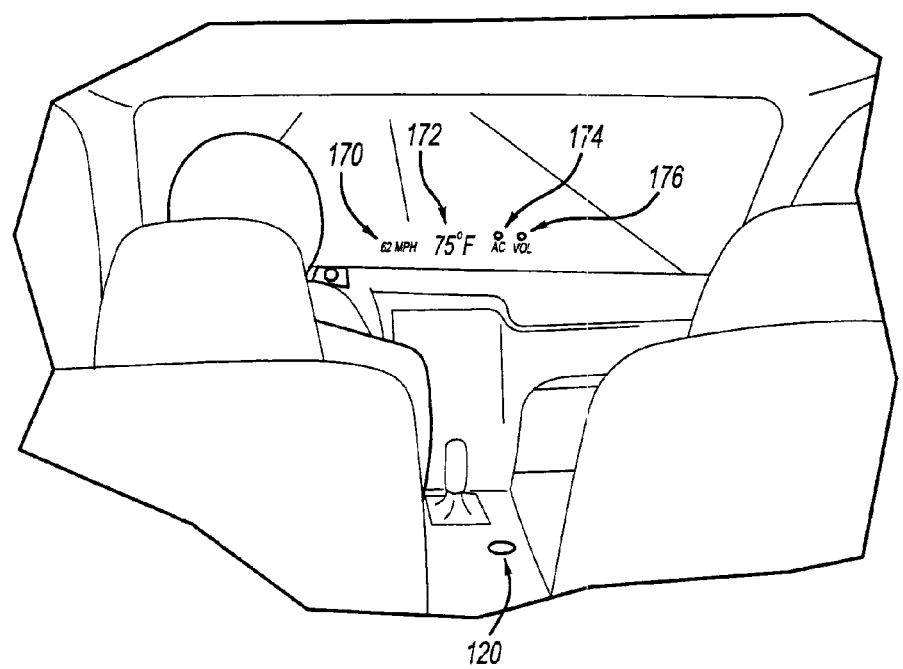
FIG. 18 illustrates images displayed on the windshield with one of the images enlarged.

The TADM 124 transmits the target position to the display module 112. The display module 112 may then determine if an image being displayed is selected by translating the target position onto the correlating map. For example, an image set at the target position or in proximity of the target position may be selected. When an image is selected, the display module 112 may determine the predetermined control associated with the image selected. For example, in FIG. 16, the user performs the gesture G for selecting the temperature being displayed (image 172). As shown in FIG. 18, the image 172 of the temperature is enlarged to provide a zoomed in view of the image by the display module 112.

Figure 19:
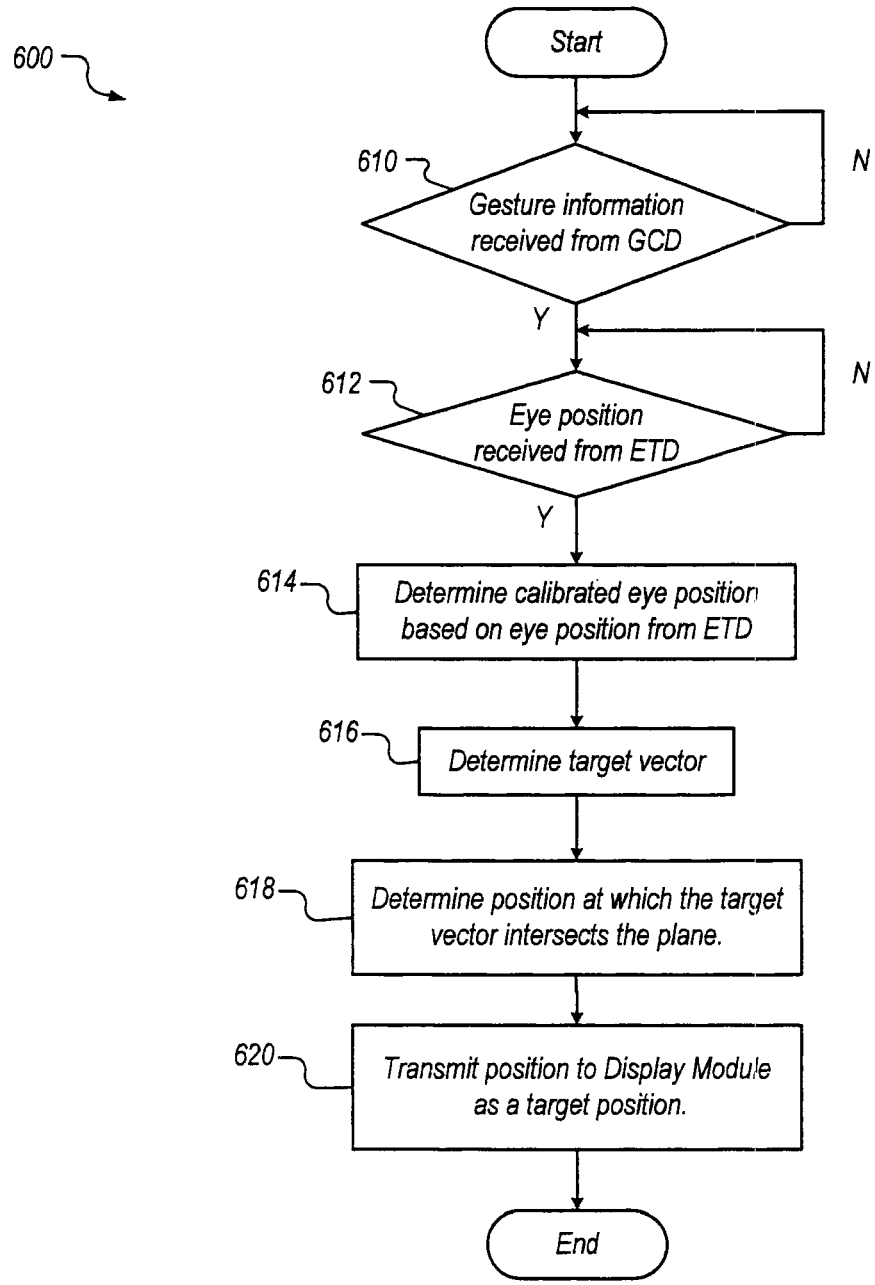
FIG. 19 is a flow chart of an example method for determining the position at which a target vector intersects a plane based on the gesture and the eye position.

With reference to FIG. 19, an example method 600 performed by the TADM 124 for determining the position of the target vector is presented. Similar to the method 500 shown in FIG. 15, the TADM 124 determines whether information, such as the center point position and the size of the gesture, have been received from the GCD 120, at 610. If 610 is false, the TADM 124 remains at 610. If 610 is true, the TADM 124 proceeds to 612.

At 612 the TADM 124 determines whether the eye position has been received from the ETD 122. If 612 is false, the TADM 124 remains at 612. If 612 is true, the TADM 124 translates the eye position into the world coordinate system at 614.

The TADM 124 then determines, at 616, the target vector 150 based on the gesture center point and the calibrated eye position. At 618 the TADM 124 determines the position at which the target vector intersects the plane which is represented by the map stored in the memory 128. Once, the position is determined, the TADM 124 transmits the position to the display module 112 as the target position at 620. Based on the target position received from the TADM 124, the display module 112 determines which image is selected and performs the predetermined control based on the image selected.

Using gesture and eye recognition, the image capturing system 110 determines a position along the heads-up display based on a gesture performed by the occupant. The image capturing system 110 allows the occupant to select images being displayed by the display module 112 per a predefined gesture. Accordingly, the occupant is able to control various vehicle features without having to filter through, for example, a menu on a display screen which may be time consuming and distracting.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

The term memory and/or storage unit may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

In this application, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

What is claimed is:

1. An image capturing system for a vehicle for capturing an image of a target area based on a predefined gesture performed by an occupant of the vehicle, the image capturing system comprising:
    an on-board camera disposed on a body of the vehicle and capturing an image of the target area, wherein the on-board camera has an image field-of-view within which the image is captured and the image field-of-view overlaps with the target area;
    a gesture capture device determining a gesture position in a three-dimensional space of a gesture performed by the occupant with respect to a reference point, wherein the gesture is the predefined gesture;
    an eye tracking device determining an eye position of the occupant;
    a processor operating as a target area determination module, wherein the target area determination module determines a target vector extending from the eye position toward the gesture position and aligns the on-board camera in accordance with the target vector, such that a first target object in the target area pointed by the target vector appears in the image taken by the on-board camera; and
    a memory unit storing the image captured by the on-board camera when the predefined gesture is detected, wherein the memory unit is a computer-readable medium.

2. The image capturing system of claim 1 wherein the target area determination module transmits the image to a display module of the vehicle, wherein the display module displays the image.

3. The image capturing system of claim 1 wherein the target area determination module transmits the image to a portable device via a wireless communication module disposed within the vehicle.

4. The image capturing system of claim 1 wherein the target area determination module transmits the image to a data server via a wireless communication module disposed within the vehicle.

5. The image capturing system of claim 1 wherein the gesture capture device further comprises:
    a gesture camera that captures movement within a space defined by a field of view of the gesture camera; and a gesture determination module that determines whether the movement captured is of the predefined gesture.

6. The image capturing system of claim 1 wherein the eye tracking device determines a viewpoint of the occupant and determines the eye position based on the viewpoint.

7. The image capturing system of claim 6 wherein the eye tracking device determines the eye position as a position of a right eye when the viewpoint is from the right eye, determines the eye position as a position of a left eye when the viewpoint is from the left eye, and determines the eye position as a position of a midpoint between the right eye and the left eye when the viewpoint includes both the right eye and the left eye.

8. The image capturing system of claim 1 wherein
the gesture capture device determines a size of the gesture, and
the target area determination module adjusts a zoom level and a size of the image field-of-view based on the size of the gesture, such that the target vector passes through the image field-of-view.

9. The image capturing system of claim 1 wherein
the on-board camera detects an object within the image field-of-view, and
the target area determination module adjusts a zoom level and a size of the image field-of-view based on the object detected by the on-board camera, such that the target vector passes through the image field-of-view after the zoom level and the size of the image field-of-view is adjusted.

10. An image capturing method for a vehicle for capturing an image of a target area with an on-board camera disposed on the vehicle, the method comprising:
determining whether a gesture performed by an occupant is a predefined gesture for capturing the image;
determining a position of the gesture in a three-dimensional space when the gesture is the predefined gesture, wherein the position of the gesture is with respect to a reference point;
determining an eye position of the occupant with respect to the reference point;
determining a target vector based on the eye position and the position of the gesture, wherein the target vector extends from the eye position towards the position of the gesture;
aligning the on-board camera in accordance with the target vector, such that a first target object in the target area pointed by the target vector appears in the image taken by the on board camera;
capturing the image with the on-board camera; and
storing the image in a memory when the predefined gesture is detected, wherein the memory is a computer readable medium.

11. The image capturing method of claim 10 further comprising:
using a display module disposed in the vehicle, displaying the image captured by the on-board camera.

12. The image capturing method of claim 10 further comprising:
using a wireless communication module disposed in the vehicle, transmitting the image to a portable device.

13. The image capturing method of claim 10 further comprising,
using a wireless communication module disposed in the vehicle, transmitting the image to a data server external of the vehicle.

14. The image capturing method of claim 10 wherein determining the eye position further comprises:
determining a viewpoint of the occupant as a right eye, a left eye, or both the right and the left eye; and
determining the eye position based on the viewpoint, wherein the eye position is a position of the right eye when the viewpoint is from the right eye, the eye position is a position of the left eye when the viewpoint is from the left eye, and the eye position is a position of a midpoint between the left eye and the right eye when the viewpoint is from both the right eye and the left eye.

15. An image selection system for a vehicle for selecting an image displayed along a plane by a display module based on a predefined gesture performed by an occupant of a vehicle, the system comprising:
a gesture capture device determining features of a gesture performed by an occupant, the features including a position of a center of the gesture with respect to a reference point, wherein the gesture is the predefined gesture;
an eye tracking device determining a viewpoint of the occupant and an eye position of the occupant based on the viewpoint, wherein the eye position is the position of the viewpoint with respect to the reference point; and
a processor operating as a target area determination module, wherein the target area determination module determines a target vector extending from the eye position toward the center of the gesture, and determines a position along the plane at which the target vector intersects the plane;
wherein the eye tracking device determines the eye position as a position of a right eye when the viewpoint is from the right eye, determines the eye position as a position of a left eye when the viewpoint is from the left eye, and determines the eye position as a position of a midpoint between the right eye and the left eye when the viewpoint includes both the right eye and the left eye.

16. The image selection system of claim 15 wherein the target area determination module transmits the position to the display module which determines whether the position correlates with the image being displayed.

* * * * *